United States Patent Office 3,679,649
Patented July 25, 1972

3,679,649
POLYVINYL ALCOHOL ESTERIFICATION IN N-METHYL-2-PYRROLIDONE
Harlan B. Freyermuth, Easton, and Nathan D. Field, Allentown, Pa., assignors to GAF Corporation, New York, N.Y.
No Drawing. Filed Dec. 29, 1969, Ser. No. 888,816
Int. Cl. C08f 27/12
U.S. Cl. 260—91.3 VA          5 Claims

ABSTRACT OF THE DISCLOSURE

A process of esterifying polyvinyl alcohol using N-methyl-2-pyrrolidone as a solvent is disclosed.

---

This invention relates to the preparation of esters of polyvinyl alcohol and more particularly to the preparation of esters of polyvinyl alcohol using an N-methyl-2-pyrrolidone solvent.

One method of preparing polyvinyl alcohol esters is based on the preparation of a monomeric vinyl ester followed by polymerization thereof. Such a polymerization can be conducted merely by applying heat or can be conducted more quickly by the use of free radical catalysts such as benzoyl peroxide or tert butyl peroxide. Ultraviolet radiation can also be used to effect polymerization.

Another method of forming a polyvinyl alcohol ester is to esterify the polyvinyl alcohol with a suitable acid constituent. It has been proposed to esterify polyvinyl alcohol with acrylic acid, methacrylic acid, α-chloroacrylic acid, crotonic acid, or maleic acid. This could, however, result in a hard resinous product unsuitable for certain uses.

Another method of forming polyvinyl alcohol esters such as the cinnamic acid ester of polyvinyl alcohol has been disclosed in the prior art. The process by which the polyvinyl cinnamate is prepared involves heating polyvinyl alcohol with cinnamoyl chloride in a pyridine medium. The polyvinyl cinnamate thus prepared finds particular use as a photoresist for the production of printed circuits, integrated circuits, chemical milling and the like.

It has been found that the aforementioned method of preparing polyvinyl alcohol esters by reacting polyvinyl alcohol with an acid chloride often results in complications. One notable such complication, for example, is the formation of a black residue caused by secondary reactions when 2,3-dichloroacryloyl chloride and polyvinyl alcohol are condensed in pyridine solution. Further, certain esters are only partially soluble in particular solvents thereby lessening their utility as photoresists.

Accordingly, it is a primary object of the present invention to provide a method for producing esters of polyvinyl alcohol which is free of the aforementioned and other such disadvantages.

It is a further object of the present invention to provide a method for the esterification of polyvinyl alcohol which can be conducted easily and without side reactions.

It is still another object of the present invention to provide an improved method for esterifying polyvinyl alcohol with an acid halide.

It is yet another object of the present invention to provide a method for making polyvinyl alcohol esters suitable for use as photoresists.

According to the present invention, the polyvinyl alcohol is esterified with an acid halide using N-methyl-2-pyrrolidone as the reaction medium. Preferably, the polyvinyl alcohol is first suspended in the N-methyl-2-pyrrolidone at room temperature and then heated with stirring at an elevated temperature. The elevated temperature could conveniently be that obtained on a steam bath. A more preferred method is to suspended the polyvinyl alcohol in the N-methyl-2-pyrrolidone which has been cooled to about 0–5° C. before the heating is begun. The N-methyl-2-pyrrolidone serves as both a solvent and an acid binding agent.

The polyvinyl alcohol used in the preparation of the ester derivatives may vary in both molecular weight and extent of hydrolysis. Ester derivatives of medium viscosity and highly hydrolyzed polyvinyl alcohol products give very satisfactory photoresist images. The degree of esterification can be varied by varying the proportions of polyvinyl alcohol and acid halide. Further, mixed esters of two acids can also be made using the present invention.

A variety of acid halides may be used according to the present invention. Exemplary of these acid halides, but by no means limiting, are o-chloro- or m-nitrocinnamic acid halides such as o-chlorocinnamic acid chloride, m-nitrocinnamic acid chloride, cinnamic acid bromide, alkylated cinnamic acid halide, α- and β-phenylcinnamic acid chloride, 3-ethoxyacryloyl chloride, 3-methoxyacryloyl chloride, 2,3-dichloroacryloyl chloride, 3-furylacryloyl chloride, 3-phenoxyacryloyl chloride, 3-naphthylacryloyl chloride and 3-anthrylacryloyl chloride.

EXAMPLE 1

Eleven grams of medium molecular weight, highly hydrolyzed polyvinyl alcohol was gradually added with stirring to 100 ml. N-methyl-2-pyrrolidone at room temperature in a 500 ml. 3-necked flask with a stirrer, thermometer, condenser, and drying tube attached. The mixture was heated and stirred on a steam bath at 90–95° C. overnight. An additional 100 ml. of N-methyl-2-pyrrolidone was added the next morning at 90–95° C. and the solution of polyvinyl alcohol was cooled to 50° C. Molten cinnamoyl chloride (50 g.; M.W. 166.6; M.P. 34–35° C.) was added by means of a heated dropping funnel to the reaction mixture at 50–55° C. during 20 minutes. The temperature was held at 50–55° C. for 4 hours. The reaction mixture was poured slowly with rapid stirring into a solution of 64 g. sodium carbonate and 2 liters of water. The precipitated polymer was shredded several times with water in a Waring Blendor, the product being filtered on a Buchner funnel after each treatment. After drying in a vacuum oven at 60° C., 40.5 g. of the cinnamate ester of polyvinyl alcohol was obtained.

EXAMPLE 2

A 250 ml. 3-necked flask equipped with a stirrer, thermometer, condenser and drying tube was charged with 50 ml. N-methyl-2-pyrrolidone and after cooling with an ice bath to 0–5° C., 5.5 g. highly hydrolyzed medium viscosity polyvinyl alcohol was added slowly with stirring during a 5 minute period of time. The mixture was heated with stirring at 90–95° C. on the steam bath overnight. The next morning 50 ml. more N-methyl-2-pyrrolidone was added and the mixture was cooled to 20–25° C. by a cold water bath. By means of a dropping funnel, 15 g. of 3-ethoxyacryloyl chloride, prepared by the reaction of liquid phosgene and ethylvinyl ether according to the process described in Example 1 of U.S. Pat. 2,768,174, was added dropwise during 10 minutes with rapid agitation. The viscosity of the reaction mixture decreased during the addition of the acid chloride. Stirring at 20–25° C. was continued for 45 minutes or until the exothermic reaction had completely subsided. The reaction mixture was drowned in a small stream in 2 liters of water with rapid stirring. The rubbery material was shredded with water in a Waring Blendor and filtered on a Buchner funnel. This procedure was repeated three more times.

EXAMPLE 3

A 500 ml. 3-necked flask with a stirrer, thermometer, condenser, drying tube and dropping funnel was charged with 100 ml. N-methyl-2-pyrrolidone. After cooling to 0–5° C. in an ice bath 11 g. polyvinyl alcohol (medium viscosity-high hydrolysis) was gradually added. The polyvinyl alcohol was dissolved by heating (90–95° C.) on a steam bath overnight. The following morning, 50 ml. more N-methyl-2-pyrrolidone was added. The temperature was adjusted to 50° C.–55° C. and 48 g. 2,3-dichloroacryloyl chloride was added dropwise with stirring during 25 minutes. The reaction mixture was stirred an additional hour to complete the acylation. The reaction mixture was drowned into 2 liters of water with rapid stirring. The precipitated polymer was shredded in a Waring Blendor with water and filtered. This procedure was repeated three times.

EXAMPLE 4

5.5 g. polyvinyl alcohol (medium molceular weight; high hydrolysis) was gradually added to 50 ml. N-methyl-2-pyrrolidone at room temperature in a 250 ml. 3-neck flask equipped with a stirrer, thermometer, drying tube and dropping funnel. The mixture was heated overnight on a steam bath at 90–95° C. The next morning 11 ml. pyridine was added and at 50° C. a solution of 19.2 g. 3-furylacryloyl chloride dissolved in 50 ml. N-methyl-2-pyrrolidone was added dropwise during 15 minutes. The mixture was stirred for one-half hour at 50° C. and then drowned into 2 liters water with rapid agitation. The granular ester derivative of polyvinyl alcohol was filtered on a Buchner funnel. The product was ground thoroughly with water in a Waring Blendor and filtered.

What is claimed is:

1. In the process of preparing esters of polyvinyl alcohol by esterifying polyvinyl alcohol with an acid halide, the improvement comprising conducting said esterification in the presence of N-methyl-2-pyrrolidone as the solvent.

2. The process of claim 1, wherein said polyvinyl alcohol is dissolved in said N-methyl-2-pyrrolidone prior to the addition of said acid halide.

3. The process of claim 2, wherein said polyvinyl alcohol is dissolved in said N-methyl-2-pyrrolidone at room temperature and then heated to about 90–95° C., prior to the addition of said acid halide.

4. The process of claim 2, wherein said polyvinyl alcohol is dissolved in said N-methyl-2-pyrrolidone at about 0–5° C. and then heated to about 90–95° C., prior to the addition of said acid halide.

5. The process of claim 1, wherein said acid halide is selected from the group consisting of cinnamoyl chloride, ethoxyacryloyl chloride, 2,3-dichloroacryloyl chloride and 3-furylacryloyl chloride.

References Cited

UNITED STATES PATENTS

| 3,033,842 | 5/1962 | Holtschmidt | 260—91.3 |
| 3,560,465 | 2/1971 | Reynolds | 260—91.3 |

FOREIGN PATENTS

| 531,405 | 10/1956 | Canada | 260—91.3 |
| 1,013,105 | 12/1965 | England | 260—91.3 |

JOSEPH L. SCHOFER, Primary Examiner

S. M. LEVIN, Assistant Examiner